United States Patent

Zikeli et al.

[11] Patent Number: 5,890,504
[45] Date of Patent: Apr. 6, 1999

[54] PROCESS FOR TRANSPORTING A THERMALLY UNSTABLE VISCOUS MASS

[75] Inventors: Stefan Zikeli, Regau; Klaus Weidinger, Lenzing; Friedrich Ecker, Timelkam; Michael Longin, Lenzing, all of Austria

[73] Assignee: Lenzing Aktiengesellschaft, Lenzing, Austria

[21] Appl. No.: 817,809

[22] PCT Filed: Aug. 16, 1996

[86] PCT No.: PCT/AT96/00152

§ 371 Date: Apr. 17, 1997

§ 102(e) Date: Apr. 17, 1997

[87] PCT Pub. No.: WO97/08482

PCT Pub. Date: Mar. 6, 1997

[30] Foreign Application Priority Data

Aug. 31, 1995 [AT] Austria .................................. 1462/95

[51] Int. Cl.[6] .................................................. F16K 17/16
[52] U.S. Cl. ...................... 137/1; 137/68.23; 137/115.26
[58] Field of Search ........................ 137/1, 68.19, 68.23, 137/115.13, 115.26, 115.28, 118.06

[56] References Cited

U.S. PATENT DOCUMENTS

| 443,873 | 12/1890 | Snow | 137/68.23 X |
|---|---|---|---|
| 2,179,181 | 11/1939 | Graenacher et al. | 106/200.3 |
| 4,353,384 | 10/1982 | Gerdner | 137/68.23 |
| 4,403,626 | 9/1983 | Paul, Jr. | 137/68.25 |
| 5,337,776 | 8/1994 | Perry et al. | 137/1 |

FOREIGN PATENT DOCUMENTS

| 501917 | 7/1930 | Germany | 137/68.23 |
|---|---|---|---|
| 682411 | 2/1965 | Italy | 137/68.23 |
| 859737 | 8/1981 | U.S.S.R. | 137/68.23 |
| 553070 | 7/1993 | WIPO . | |

OTHER PUBLICATIONS

Buijtenhuijs et al. Das Papier, vol. 40, No. 12, pp. 615–619 (1986).

*Primary Examiner*—John Rivell
*Attorney, Agent, or Firm*—Baker & Botts LLP

[57] ABSTRACT

The invention is concerned with a process for transporting a thermally unstable viscous mass through a pipe having a predetermined breaking point to release excess pressure, which predetermined breaking point breaks when the excess pressure is reached, the excess pressure thus being released, and is characterized in that the predetermined breaking point is provided in the interior of the pipe, provided that the predetermined breaking point is not provided as a portion of the inner wall of the pipe.

9 Claims, 1 Drawing Sheet

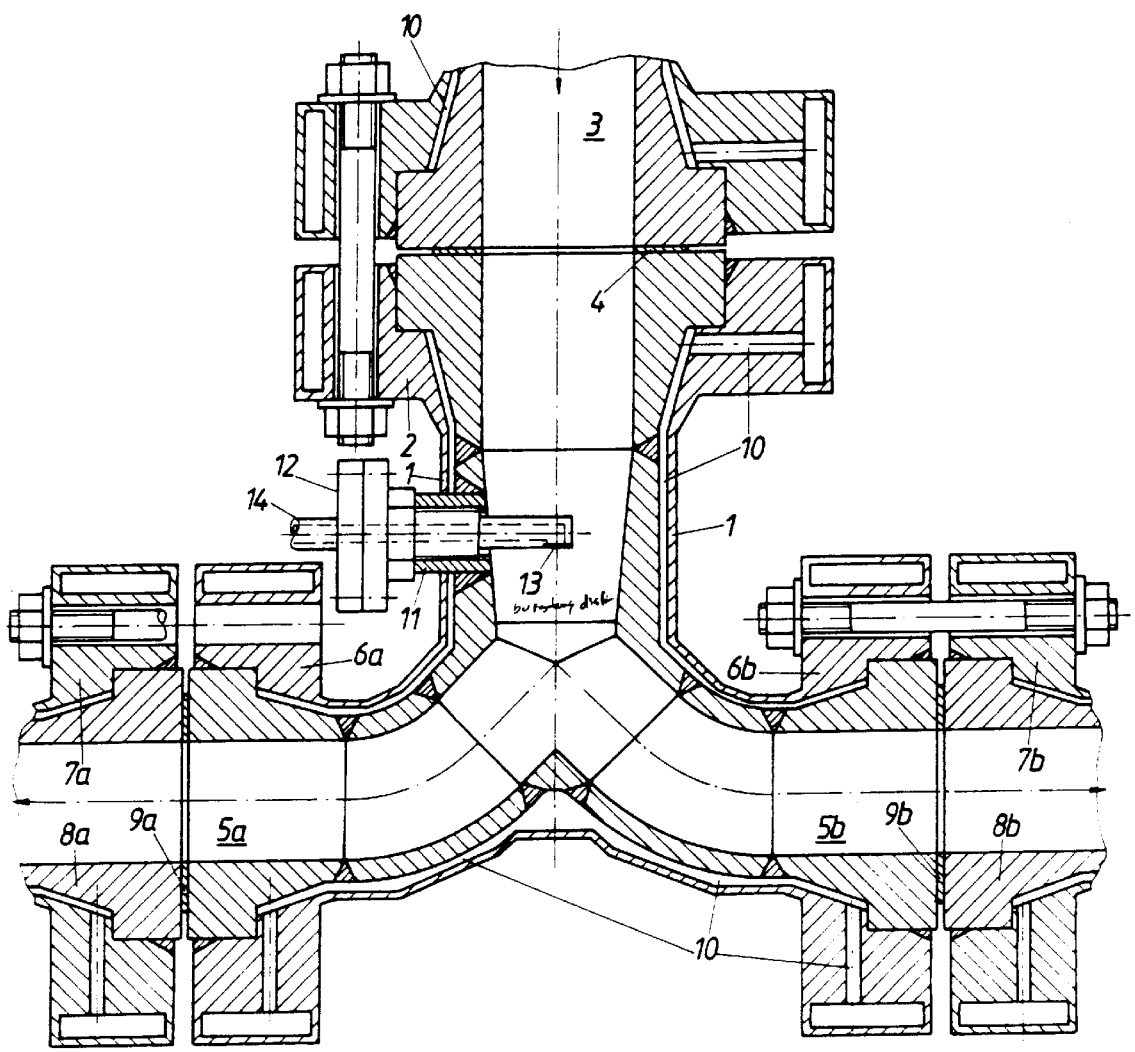
FIG.

5,890,504

PROCESS FOR TRANSPORTING A THERMALLY UNSTABLE VISCOUS MASS

The invention is concerned with a process for transporting a thermally unstable viscous mass through a pipe having a predetermined breaking point to release excess pressure, which predetermined breaking point breaks when the excess pressure is reached, the excess pressure thus being released. Further, the invention is concerned with a device for carrying out the process.

BACKGROUND OF THE INVENTION

For the purposes of the present specification and claims, the term viscous mass is used particularly for a solution containing cellulose and an aqueous tertiary amine-oxide able to be processed to cellulose moulded bodies of any kind, particularly fibers and films.

Tertiary amine-oxides have been known as alternative solvents for cellulose. It is known for instance from U.S. Pat. No. 2,179,181 that tertiary amine-oxides are capable of dissolving cellulose without derivatisation and that from these solutions cellulose moulded bodies, such as fibers, may be produced by precipitation. From EP-A-0 553 070 of the present assignee, further tertiary amine-oxides are known. In the following, all tertiary amine-oxides capable of dissolving cellulose are meant when, for the sake of simplicity, only NMMO (=N-methylmorpholine-N-oxide) is cited.

As alternative solvents, tertiary amine-oxides are advantageous insofar as the cellulose is dissolved by the NMMO without derivatisation, contrary to the viscose process. Thus the cellulose does not have to be chemically regenerated, the NMMO remains chemically unchanged and passes during its precipitation into the precipitation bath and may be recovered from the latter and reused for the preparation of a new solution. Therefore the NMMO process offers the possibility of a closed solvent cycle. Additionally, NMMO has an extremely low toxicity.

However, when cellulose is dissolved in NMMO, the polymerisation degree of the cellulose decreases. Moreover, particularly the presence of metal ions (such as $Fe^{3+}$) leads to radically initiated chain cleavages and thus to a significant degradation of the cellulose and the solvent (Buijtenhuijs et al. (The Degradation and Stabilization of Cellulose Dissolved in N-Methylmorpholin-N-Oxide (NMMO), in "Das Papier", Volume 40, number 12, pages 615–619, 1986).

On the other hand, amine-oxides generally have only a limited thermal stability which varies depending on their structure. Under normal conditions, the monohydrate of NMMO is present as a white crystalline solid, which melts at 72° C. Its anhydric compound however melts at no less than 172° C. When heating the monohydrate, intense discoloration will occur from 120°/130° C. up. From 175° C. up, an exothermal reaction is initiated, the molten mass being completely dehydrated and great amounts of gas developing which eventually lead to an explosion, the temperatures rising to far over 250° C.

It is known that metallic iron and copper and particularly their salts significantly reduce the decomposition temperature of NMMO, while the decomposition rate is simultaneously increased.

Moreover, additionally to the problems mentioned above, there is another difficulty, i.e. the thermal instability of the NMMO/cellulose solutions themselves. This means that at the elevated processing temperatures (approximately 110°–120° C.), uncontrollable decomposition processes are initiated in the solutions which due to the development of gases may lead to strong deflagrations, fires and even explosions.

To release the excess pressure in pipes produced in the decomposition processes mentioned above, a pipe element having a predetermined breaking point as portion of the pipe wall is known from U.S. Pat. No. 5, 337,776. This predetermined breaking point is provided as a bursting disk. Due to the incorporation of the bursting disk into the pipe wall however, the heating jacket of the pipe is interrupted and therefore the transported mass will cure at the unheated surface of the bursting disk if the transported mass cools down below the solidification point. Another reason for which this solidificated mass will stick to the bursting disk and will not be transported along with the other mass is the reduced rate at the wall. This does not only impair the purpose of the bursting disk, i.e. its timely response, but also a contamination of transported mass will occur if decomposition products are produced in the mass deposited at the bursting disk. This may be the case for instance in solutions of cellulose in tertiary amine-oxides.

Moreover, when incorporating bursting disks into a pipe wall, they have to be dimensioned taking into account the required relief section, which may be calculated by those skilled in the art from the maximum pressure increase rate of the mass system. This means that bursting disk sections which fit to the pipe volume have to be chosen and incorporated. It would be advantageous however to employ bursting disks as small as possible, since the pipe diameter they occupy is reduced and the curvature of the bursting disk diameter adjusts well to the curvature of the pipe wall.

Therefore, an optimum has to be devised whereby the flow rate in the pipe interior is adjusted to the highly viscous flow behaviour by means of the inner diameter of the pipe. Thus, when the mass is highly viscous, reduced shearing rates in the pipe are attained, which is equivalent to a suitably big pipe diameter. When such a pipe is protected by means of a bursting disk arranged level to the pipe interior according to the method known from U.S. Pat. No. 5, 337,776, this will occupy an unnecessarily big circumferencial area of the pipe for the holding device of the bursting disk, leading to the problems described above.

According to U.S. Pat. No. 5,337,776, the bursting disk is adjusted to the pipe. This however is not necessary because of the maximum pressure generating rate of the unstable mass system. This means that a bursting disk having an optimized diameter should be employed.

When due to a higher relief a bigger bursting disk section is required, a poorer adjustment will result, since the pipe circumenference occupied by the bursting disk is big and thus the flow behaviour in the pipe may be deteriorated.

SUMMARY OF THE INVENTION

This is the starting point of the present invention: It is its object to provide a process for transporting thermally unstable viscous masses, particularly a process for transporting a dope containing cellulose and an aqueous tertiary amine-oxide, which does not exhibit the above problems.

The process according to the invention for transporting a thermally unstable viscous mass through a pipe having a predetermined breaking point for releasing excess pressure, which predetermined breaking point breaks when the excess pressure is reached, the excess pressure thus being released, is characterized in that the predetermined breaking point is provided in the interior of the pipe, provided that the predetermined breaking point is not provided as a portion of the inner wall of the pipe.

It has been shown that by providing the predetermined breaking point in the interior of the pipe according to the invention, not only an efficient release of any excess pressure is assured, but also the interruption of the heating jacket caused by the incorporation of the predetermined breaking point having an optimized section into the pipe may be kept so low that there will be no negative effect on the transport of the viscous mass.

Moreover, it is assured that the predetermined breaking point is located within the well tempered mass.

A preferred embodiment of the process according to the invention consists in that the predetermined breaking point is provided in the pipe substantially centered. It has turned out that the predetermined breaking point is best provided substantially averted to the transport direction of the mass.

Conveniently, the predetermined breaking point provided according to the invention is provided as a bursting disk.

The process according to the invention is particularly appropriate for transporting a highly viscous solution of cellulose in an aqueous tertiary amine-oxide.

The invention is further concerned with a device for carrying out the process according to the invention, which device comprises a pipe and a bursting disk and is characterized in that the bursting disk is provided in the interior of the pipe, provided that the bursting disk is not provided as a portion of the inner wall of the pipe.

In a preferred embodiment of the device according to the invention, the bursting disk is provided in the pipe substantially centered, and it is best provided substantially averted from the transport direction of the mass.

BRIEF DESCRIPTION OF THE DRAWINGS

The invention will be more fully appreciated by the following detailed description thereof when taken in conjunction with the accompanying drawing, in which: The single FIGURE illustrates the preferred embodiment of the invention in a pipe through which the thermally unstable viscous mass is to be transported.

DETAILED DESCRIPTION OF THE INVENTION

The drawing shows an embodiment of a pipe element according to the invention for distributing a mass flow, into which a bursting disk holding device including a bursting disk is incorporated. The transport direction of the mass is shown by arrows.

In the embodiment shown, the pipe element consists of a crosspiece 1 whereby the mass flow is divided into two equal partial flows.

Crosspiece 1 is attached in a conventional manner to a feeding pipe 3 by means of a flange 2. Between feeding pipe 3 and crosspiece 1, a seal 4 is provided. Similarly, crosspiece 1 is attached at its branchings 5a and 5b by means of flanges 6a and 6b to counterflanges 7a and 7b respectively of the branchings 8a and 8b. Between the flanges 6a, 6b and 7a, 7b respectively, seals 9a and 9b respectively are provided.

In crosspiece 1, a jacket 10 for a heating medium is provided, whereby the temperature of the flowing viscous mass may be adjusted and its cooling may be prevented. Such heating jackets are also provided in counterflanges 7a, 7b of branchings 5a and 5b respectively and in the flange of feeding pipe 3. As a heating medium, water, vapour or thermo oil may be employed.

A socket 11 is welded into the wall of crosspiece 1 whereby a conventional bursting disk holding device 12 having a bursting disk 13 attached to it is introduced, the bursting disk being located in the center of the mass flowing through crosspiece 1.

When an undesired excess pressure is reached in crosspiece 1, disk 13 will break and thus the excess pressure present in crosspiece 1 may be released through outlet pipe 14.

To those skilled in the art it is evident that the bursting disk may be incorporated into any pipe-shaped body for use in transporting the mass.

We claim:

1. A method of releasing excess pressure generated during transport of a thermally unstable viscous mass through a pipe comprising the steps of:

providing excess pressure responsive means at a location within said pipe and spaced inwardly of the inner wall thereof, and releasing excess pressure occurring at said excess pressure responsive means through the wall of said pipe.

2. The method of claim 1 wherein said excess pressure responsive means is a breaking point that breaks when said excess pressure is reached.

3. The method of claim 2 wherein said breaking point is located substantially at the center of said pipe.

4. The method of claim 2 wherein said breaking point is substantially averted from the transport direction of said mass through said pipe.

5. The method of claim 2 wherein said breaking point is in the form of a bursting disc.

6. The method of any of claims 1 to 5 in which said thermally unstable viscous mass is a solution of cellulose in an aqueous tertiary amine oxide.

7. An arrangement for releasing excess pressure generated during transport of a thermally unstable viscous mass through a pipe comprising:

a hollow member extending through the wall of said pipe to a point within the pipe spaced from the inner surface thereof; and a bursting disc closing off the end of said hollow member within said pipe and adapted to break upon exposure to excess pressure;

whereby said excess pressure is released through said hollow member.

8. The arrangement of claim 7 wherein the end of said hollow member within said pipe and said bursting disc are disposed substantially at the center of said pipe.

9. The arrangement of claim 7 or 8 wherein said bursting disc is substantially averted from the transport direction of said mass through said pipe.

* * * * *